May 30, 1939. C. J. HAYTON 2,160,143
BUFFING EQUIPMENT
Filed Sept. 27, 1937  2 Sheets-Sheet 1

INVENTOR
C. J. Hayton
BY
ATTORNEY

May 30, 1939.  C. J. HAYTON  2,160,143
BUFFING EQUIPMENT
Filed Sept. 27, 1937   2 Sheets-Sheet 2
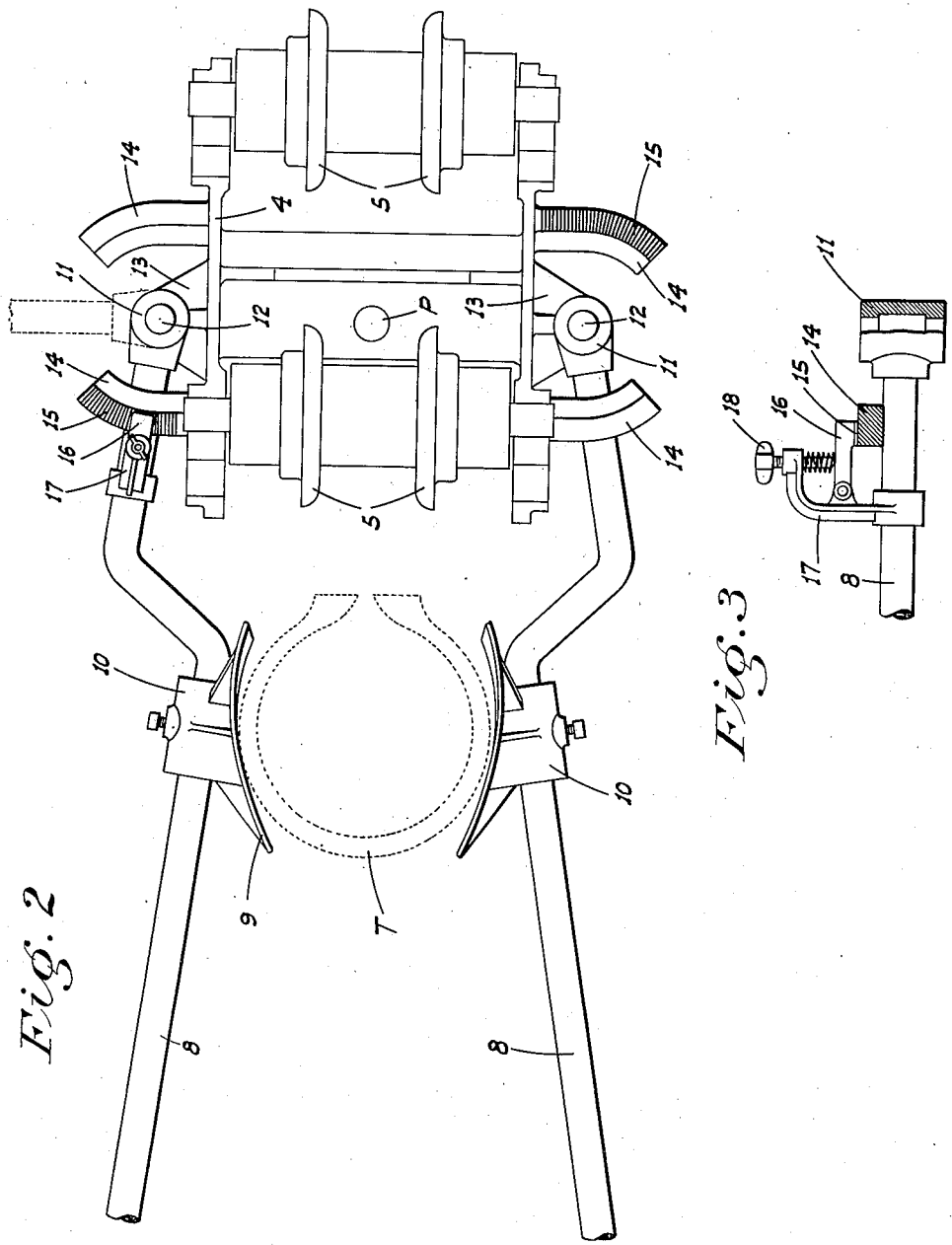

Patented May 30, 1939

2,160,143

UNITED STATES PATENT OFFICE 2,160,143

BUFFING EQUIPMENT

Charles J. Hayton, Los Angeles, Calif.

Application September 27, 1937, Serial No. 165,918

9 Claims. (Cl. 29—76)

This invention relates to tire buffing equipment and particularly to a buffing machine of the type shown in U. S. patent to H. J. Woock No. 1,848,684 dated March 8, 1932.

In this and similar machines, the tire to be buffed is supported for free rotation on a carrier which is mounted for free swinging movement in various directions in a horizontal plane so as to enable all portions of the lateral tread surface of the tire to be successively brought into frictional engagement with the buffing elements. As the tire is thus contacted with the rapidly rotating buffer, it also tends to rotate.

At present, such rotation is restrained or controlled, and the swinging of the carrier is also controlled, by the hands of the operator grasping the tire.

With big tires especially, it is hard for any but a very strong man to hold the tire against rotation and properly control its movements, and in any event, the operator must stand close to the tire and consequently to the machine so that the rubber fragments being buffed from the tire are apt to get in his eyes and to be drawn into the lungs.

It is therefore the principal object of my invention to facilitate handling of the tires by mounting a manually controlled tire engaging brake structure on the tire carrier, so arranged that rotation of the tire, and control of the swinging of the carrier, may be effected from a point some distance back from the machine, and so that far less strength is needed to hold the tire against rotation than must at present be employed.

Another very important feature is the increase in safety my device affords to the operator. With present equipment, accidents are common, especially to beginners in the trade, and frequently hands or arms are badly cut or torn by being pulled against the rasp when the tire gets out of control. With my device, the operator is so far from the rasp that even if he should slip on the floor, there is little likelihood of his coming in contact with the rasp.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is a top plan view of the tire-carrier and brake unit, detached.

Figure 3 is a fragmentary side view of a brake operating arm, showing the clamp attachment.

Figure 1:
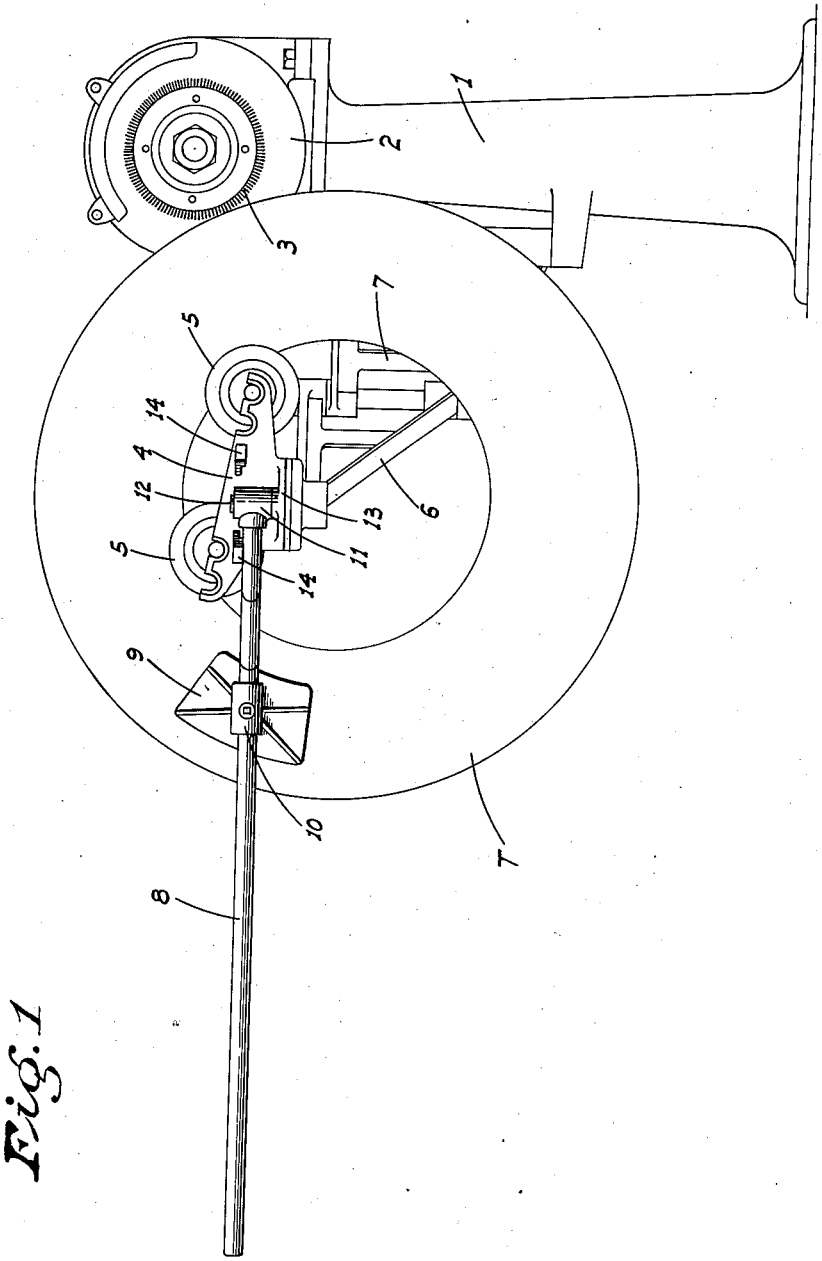
Figure 1 is an end elevation of a buffing machine as in operation and equipped with the tire brake.

Referring now more particularly to the characters of reference on the drawings, the buffing machine comprises a pedestal 1 on which is mounted an electric motor 2. This is directly connected to the tire buffing equipment which includes a rotary rasp 3.

The tire carrier, on which my brake attachment is mounted, comprises a box 4 which supports a pair of horizontally spaced roller units 5 adapted to support a tire at the beads as shown. The carrier box is supported for swivel movement in a horizontal plane about a pin P on a secondary arm 6 which is hinged for similar movement on a main arm 7, the arm 7 in turn being hinged on the pedestal 1. These parts are all standard in the buffing machine of the patent referred to and of themselves form no part of my invention.

My brake attachment comprises a pair of operating arms 8 of suitable length, on which brake shoes 9 are mounted. These shoes face each other between the arms so as to engage the opposite sides of a tire T supported on the carrier, and are rigid with sleeves 10 adjustable along the arms so that the shoes may be properly positioned according to the diameter of the tire being handled. On their inner ends, the arms are provided with hubs 11 which removably and turnably engage pins 12 upstanding from brackets 13 on opposite sides of the carrier box. The pins are in a line with the pivot P of the carrier.

The hold the arms against removal except when disposed substantially at right angles to the carrier, while allowing them a certain amount of swinging movement, I provide opposed retainer bars 14. These are arcuate with the pins 12 and overhang the arms, projecting out from and being secured on the opposite sides of the carrier box. The upper faces of the diagonally disposed ones of the arms are serrated as at 15, to alternately cooperate with a clamping block 16. This block is mounted on a bracket 17 secured on one of the arms, and is releasably moved into clamping engagement with the bar by a thumb screw 18.

In this manner, one of the arms is held relatively immovable so that the carrier and said arm form a rigid unit, enabling the swinging of the carrier to be controlled from said arm. At the same time, the other arm is free to swing toward the immovable arm, so that the tire may be gripped by the brake shoes with any desired pressure, or released for rotation. The reason for the use of the retaining bars on opposite sides of the pins 12, is that in the operation of the apparatus, the position of the carrier must be reversed when shifting from the rasp at one end of the motor to the buffer at the other end of the motor, and vice versa. Consequently, the brake arms must be swung so as to project from the opposite end of the carrier when the latter is thus reversed. If the use of the brake attachment is not desired, the arms 8 may be quickly removed by swinging them to positions between the retaining bars, as indicated in Fig. 2, and lifting the hubs off the pins 12. The arms of course not only serve to prevent or control the rotation of the tire, but also provide a means for controlling the swivel movement of the carrier and the tire, as the latter is being engaged about its tread area with the rasp or buffer, or is being advanced toward or retracted therefrom.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In tire buffing equipment, a tire carrier including a carrier box and elements mounted therein to rotatably support a tire, brake shoes adapted to frictionally engage a supported tire on opposite sides thereof, and movable arms adapted for hand engagement and manipulation, mounted on the carrier box and connected to the shoes.

2. In tire buffing equipment, a tire carrier including a carrier box and elements mounted therein to rotatably support a tire, brake shoes positioned to engage a supported tire on opposite sides thereof, and hand actuated means connected to the box and to the shoes to selectively bring the shoes into frictional holding engagement with the tire.

3. In tire buffing equipment, a tire carrier including a carrier box mounted for swinging movement in a horizontal plane, and elements mounted in the box to rotatably support a tire in a vertical plane parallel to the lengthwise dimension of the box, brake shoes disposed to engage a supported tire on opposite sides and beyond one end of the carrier, substantially horizontal arms on which the shoes are mounted, and vertical pivot means mounting the arms on the sides of the carrier box.

4. A structure as in claim 3, with means to releasably clamp one arm against swinging movement about its pivot.

5. In tire buffing equipment, a tire carrier including a carrier box mounted for swinging movement in a horizontal plane, and elements mounted in the box to rotatably support a tire in a vertical plane parallel to the lengthwise dimension of the box, brake shoes disposed beyond one end of the carrier to engage a supported tire on opposite sides thereof and beyond one end of the carrier, substantially horizontal arms on which the shoes are mounted, projecting lengthwise of and beyond the carrier box from opposite sides thereof, vertical pins on the sides of the box, and hubs on the adjacent ends of the arms to removably fit the pins.

6. In tire buffing equipment, a tire carrier including a carrier box mounted for swinging movement in a horizontal plane, and elements mounted in the box to rotatably support a tire, brake shoes disposed to engage a supported tire on opposite sides and beyond one end of the carrier, substantially horizontal arms on which the shoes are mounted, means removably mounting the arms on the carrier box for swinging movement in a horizontal plane, and means engaging the arms to prevent removal thereof except when the arms are swung to a position substantially at right angles to the sides of the box.

7. A structure as in claim 5, with retainer bars projecting outwardly from the box on opposite sides and overhanging the arms a predetermined distance from the pivot pins and of a length such that the arms clear the bars when moved to a position substantially at right angles to the box.

8. A structure as in claim 3, with a bar fixed on the box overhanging one arm between the pivot means thereof and the corresponding shoe, and a clamp block mounted on the arm and adapted for adjustable and releasable clamping engagement with the bar.

9. A structure as in claim 1, with means mounting the shoes on the arms for adjustment lengthwise thereof.

CHARLES J. HAYTON.